United States Patent
Schwartz et al.

(10) Patent No.: US 9,646,431 B2
(45) Date of Patent: May 9, 2017

(54) AUGMENTED REALITY SYSTEM FOR ASSESSING AN AFFECTED AREA OF AN AIRCRAFT

(71) Applicant: The Boeing Company, Chicago, IL (US)

(72) Inventors: Samantha A. Schwartz, Castle Pines, CO (US); Andre Lutz, Erzhausen (DE); Rex Bryon Douglas, Sammamish, WA (US); Nicolas Boecher, Darmstadt (DE)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 14/520,642

(22) Filed: Oct. 22, 2014

(65) Prior Publication Data
US 2016/0114907 A1 Apr. 28, 2016

(51) Int. Cl.
*B64F 5/60* (2017.01)
*G07C 5/08* (2006.01)
*G07C 5/00* (2006.01)

(52) U.S. Cl.
CPC .......... *G07C 5/0825* (2013.01); *G07C 5/008* (2013.01); *G07C 5/0808* (2013.01); *G07C 2205/02* (2013.01)

(58) Field of Classification Search
None
See application file for complete search history.

(56) References Cited

U.S. PATENT DOCUMENTS

| | | | | |
|---|---|---|---|---|
| 4,756,194 A * | 7/1988 | Grandpierre | ........... | G01N 27/20 73/799 |
| 6,910,278 B2 * | 6/2005 | Holder | ................ | B23P 6/002 33/530 |
| 8,255,170 B2 * | 8/2012 | Kollgaard | ........... | G06F 11/2294 702/188 |
| 8,696,843 B1 * | 4/2014 | Dean | ...................... | B32B 43/00 156/98 |
| 8,984,760 B1 * | 3/2015 | Thompson | ............... | G01B 3/50 33/501.08 |
| 2004/0148793 A1 * | 8/2004 | Holder | ................ | B23P 6/002 33/562 |
| 2005/0232767 A1 * | 10/2005 | Holder | ................ | B23P 6/002 416/61 |

(Continued)

*Primary Examiner* — Shelley Chen
(74) *Attorney, Agent, or Firm* — Thompson Hine LLP

(57) ABSTRACT

A system for assessing an affected area of an aircraft is disclosed. A reference marker having a known size is placed along an exterior of the aircraft. The system includes a portable electronic device including a processor in communication with a structural database. The structural database includes a template that defines a maximum allowable size of damage to the aircraft. The processor executes an instruction for determining an actual size of the affected area based on the known size of the reference marker. The processor executes an instruction for comparing the actual size of the affected area of the aircraft with the maximum allowable size of damage to the aircraft. The processor executes an instruction for determining if the actual size of the affected area exceeds the maximum allowable size of damage to the aircraft. The processor executes an instruction for determining a further action.

20 Claims, 6 Drawing Sheets

(56) References Cited

U.S. PATENT DOCUMENTS

| | | | |
|---|---|---|---|
| 2006/0007021 A1* | 1/2006 | Konya | G08G 5/0021 340/958 |
| 2006/0066470 A1* | 3/2006 | Anderson | B60Q 1/48 342/29 |
| 2008/0109187 A1* | 5/2008 | Kollgaard | G06F 11/2294 702/188 |
| 2008/0183402 A1* | 7/2008 | Malkin | G06F 17/5018 702/34 |
| 2009/0192727 A1* | 7/2009 | Ford | G01N 29/4409 702/33 |
| 2010/0161244 A1* | 6/2010 | Ghoshal | G01N 29/14 702/35 |
| 2011/0087417 A1* | 4/2011 | Anderson | B60Q 1/48 701/96 |
| 2012/0092681 A1* | 4/2012 | Cox | G01N 21/954 356/626 |
| 2012/0111478 A1* | 5/2012 | Akdeniz | G01B 3/14 156/98 |
| 2013/0024165 A1* | 1/2013 | Tardu | G06F 17/5095 703/1 |
| 2014/0100832 A1* | 4/2014 | Pado | G01M 5/0066 703/6 |

\* cited by examiner

AUGMENTED REALITY SYSTEM FOR ASSESSING AN AFFECTED AREA OF AN AIRCRAFT

FIELD

The disclosed system relates to an augmented reality system for an aircraft and, more particularly, to an augmented reality system for assessing an affected area of an aircraft and determining further action based on the assessment.

BACKGROUND

Sometimes an aircraft is damaged during service. For example, the aircraft skin may become dented, buckled, scratched, punctured, or otherwise indented during operation. When an aircraft is damaged, qualified personnel with specialized training or knowledge, such as an airline mechanic, may be needed to assess the damage to the aircraft. Specifically, the airline mechanic may determine if the aircraft should be serviced immediately before further operation. The airline mechanic may also determine if the aircraft should be restricted to specific routes until service is performed. For example, sometimes an aircraft may need to be restricted to non-reduced vertical separation minimum (non-RVSM) airspace depending on the severity and the location of the damage on the aircraft.

Inspecting the aircraft may incur significant time and expenses for an airline. For example, sometimes a damaged aircraft may be situated at an airline outstation, away from the airline's main maintenance hub. There might not be any mechanics that are qualified to inspect the damaged aircraft located at the outstation location. As a result, the airline may need to have a qualified mechanic travel from the airline's main maintenance hub to the outstation in order to inspect the aircraft. This creates travel related expenses for the airline. Moreover, it may take significant time for the airline mechanic to measure the damage on an aircraft, and to compare the damage with a diagram to assess the extent and severity of the damage. If the damage is located within a RVSM critical area of the aircraft, then it may be especially important to accurately assess the damage. Finally, airline personnel may also need to update an aircraft maintenance database as well as a flight planning schedule in the event the airline mechanic determines that the aircraft should be grounded or restricted to only non-RVSM airspace.

Those skilled in the art will readily appreciate that all of the above-mentioned issues may incur significant expense to the overall operations of an airline. Thus, there exists a continuing need for an improved, cost-effective approach for assessing damage to an aircraft.

SUMMARY

In one aspect, a system for assessing an affected area of an aircraft is disclosed. A reference marker having a known size is placed along an exterior of the aircraft. The system includes a portable electronic device including a processor in communication with a structural database. The structural database includes a template that defines a maximum allowable size of damage to the aircraft. The processor executes an instruction for determining an actual size of the affected area based on the known size of the reference marker. The processor executes an instruction for comparing the actual size of the affected area of the aircraft with the maximum allowable size of damage to the aircraft. The processor executes an instruction for determining if the actual size of the affected area exceeds the maximum allowable size of damage to the aircraft. The processor executes an instruction for determining a further action.

In another aspect, a method of assessing an affected area of an aircraft using a portable electronic device is disclosed. The method includes placing a reference marker adjacent the affected area of the aircraft, wherein the aircraft has a reduced vertical separation minimum (RVSM) critical area. The method also includes calculating a position of the reference marker based on aircraft coordinates by a processor of the portable electronic device. The method includes determining, by the processor, an actual size of the affected area based on a known size of the reference marker. The method also includes comparing, by the processor, the actual size of the affected area with a maximum allowable size of damage to the aircraft. A structural database is in communication with the processor and includes a template that defines the maximum allowable size of damage to the aircraft. The method includes determining, by the processor, if the actual size of the affected area exceeds the maximum allowable size of damage. The method further includes determining, by the processor, whether the affected area is located within the RVSM critical area based on positional information of exterior features of the aircraft stored in the structural database and the position of the reference marker. Finally, the method includes determining further action by the processor based on at least one of the actual size of the affected area and if the affected area is located within the RVSM critical area.

Other objects and advantages of the disclosed method and system will be apparent from the following description, the accompanying drawings and the appended claims.

DETAILED DESCRIPTION

Figure 1:
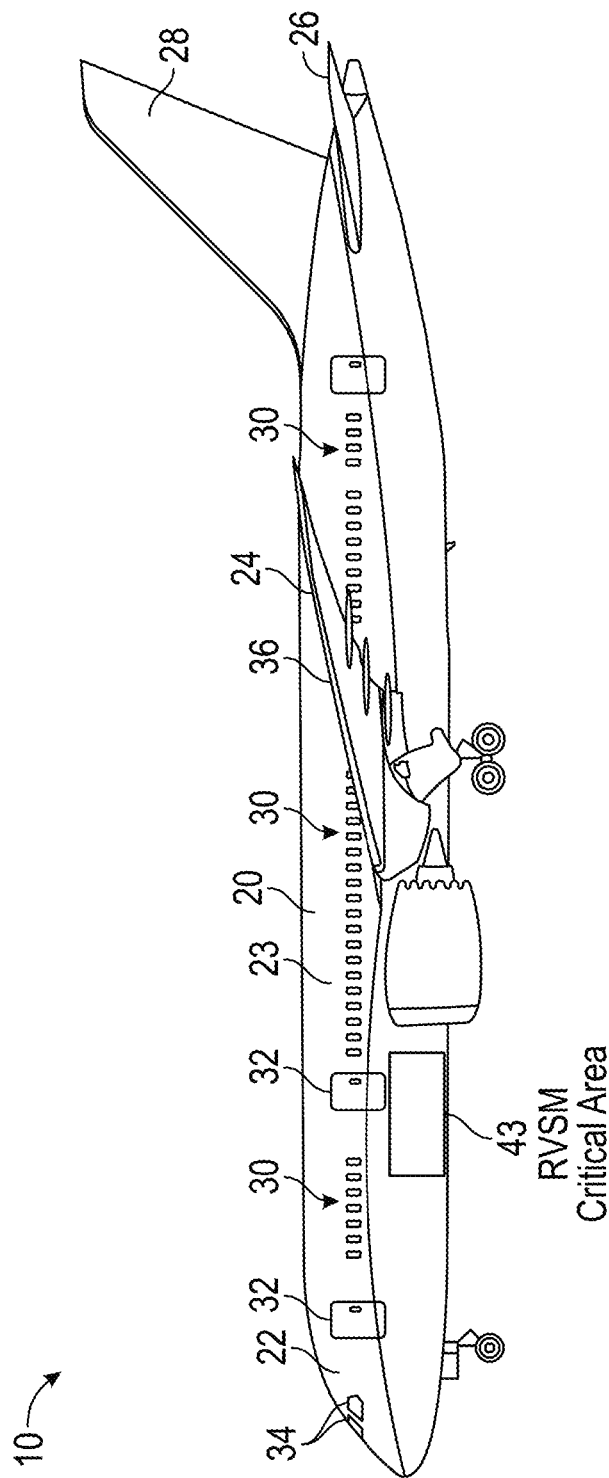
FIG. 1 is an illustration of an exemplary aircraft.

As shown in FIG. 1, the disclosed aircraft 10 according to an aspect of the disclosure includes an outer skin 20, a cockpit 22, a fuselage 23, wings 24, horizontal stabilizers 26, and a rudder 28. The aircraft 10 also includes a plurality of passenger windows 30, one or more exits 32, and a plurality of windshields 34. In one non-limiting embodiment, the outer skin 20 of the aircraft 10 is constructed of an aluminum alloy material. It is to be understood that the illustrated aircraft 10 is merely exemplary in nature, and the disclosure should not be limited to the model of aircraft 10 shown in FIG. 1.

Figure 2A:
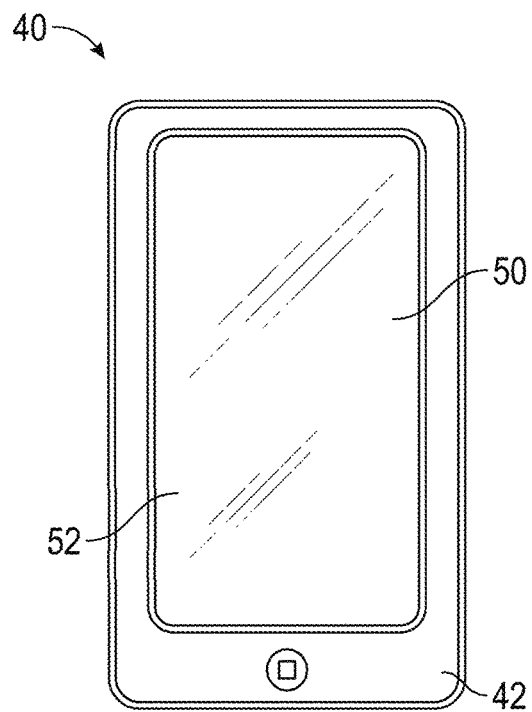
FIG. 2A is a front view of a portable electronic device that is part of the disclosed augmented reality system used to assess damage to the aircraft illustrated in FIG. 1.
Figure 2B:
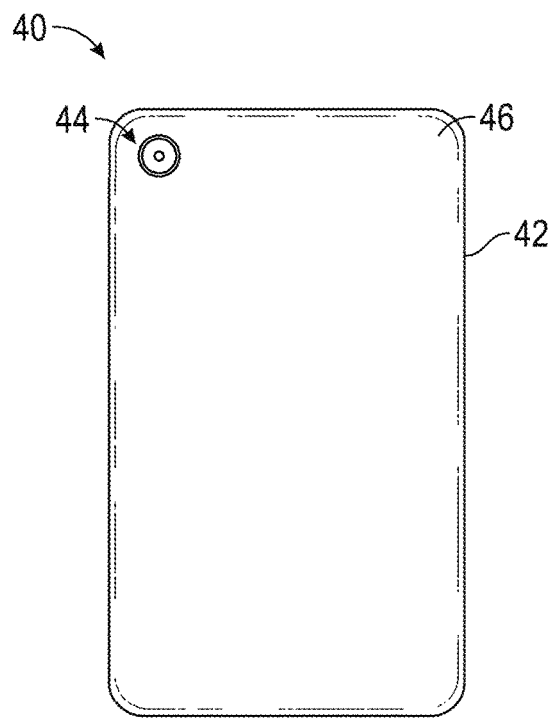
FIG. 2B is a rear view of the portable electronic device shown in FIG. 2A.

Referring now to FIGS. 1, 2A and 2B, an augmented reality system 40 including a portable electronic device 42 is used to assess damage to the aircraft 10. As explained in greater detail below, the augmented reality system 40 is used to assess an affected area of the aircraft 10. The affected area of the aircraft 10 may include visible damage to the outer skin 20 or another exterior structure of the aircraft 10. The augmented reality system 40 also determines further action based on the assessment of the damage to the aircraft 10. Some examples of exterior damage to the aircraft include, but are not limited to, dents, buckles, scratches, punctures, holes or any other type of physical indentation to the outer skin 20 of the aircraft 10. Another example of damage includes cracks in either the inner panel or the outer panel (not shown) of the windshields 34. Yet another example of damage to the exterior of the aircraft 10 includes dents along a leading edge 36 of one or more of the wings 24. The augmented reality system 40 may also include a flight maintenance and dispatch database 72 (shown in FIG. 3) that is updated based on the assessment, which is also described in greater detail below.

As seen in FIG. 2B, the portable electronic device 42 includes an imaging device 44 such as, for example, a digital camera or video recorder for scanning images of the aircraft 10. The imaging device 44 is located along a rear surface 46 of the portable electronic device 42. In one non-limiting approach, the imaging device 44 is a stereoscopic camera including three-dimensional capabilities. In the embodiments as illustrated, the portable electronic device 42 is a compact electronic device that may fit in a user's hands such as, for example, a smartphone, tablet computer, or laptop computer. However, those skilled in the art will readily appreciate that any other type of electronic device that includes a processor and imaging capabilities for scanning images of the aircraft 10 may be used as well. For example, in another approach the personal electronic device 42 is a pair of augmented reality glasses.

Referring to FIGS. 2A and 2B, portable electronic device 42 includes a display 50 as well as a user interface 52. The display 50 is any type of device capable of generating viewable images such as, for example, a liquid crystal display (LCD) or a plasma display. The user interface 52 is any type of device configured to receive input from a user such as, for example, a touchscreen, a scanning device, or a voice-activated device. In the embodiment as shown in FIGS. 2A and 2B, the user interface 52 may be a touchscreen.

Turning back to FIG. 1, a portion of the outer skin 20 may be painted or otherwise marked as a reduced vertical separation minimum (RVSM) critical area 43. Those skilled in the art will readily appreciate that it may be especially important to accurately assess any damage (e.g., dents, buckles, etc.) located along the RVSM critical area 43 of the aircraft 10. In the exemplary embodiment as shown in FIG. 1, the RVSM critical area is located between two exits 32 of the aircraft 10. However, this illustration is merely exemplary in nature, and the exact location of the RVSM critical area may vary depending on the model of aircraft.

Figure 3:
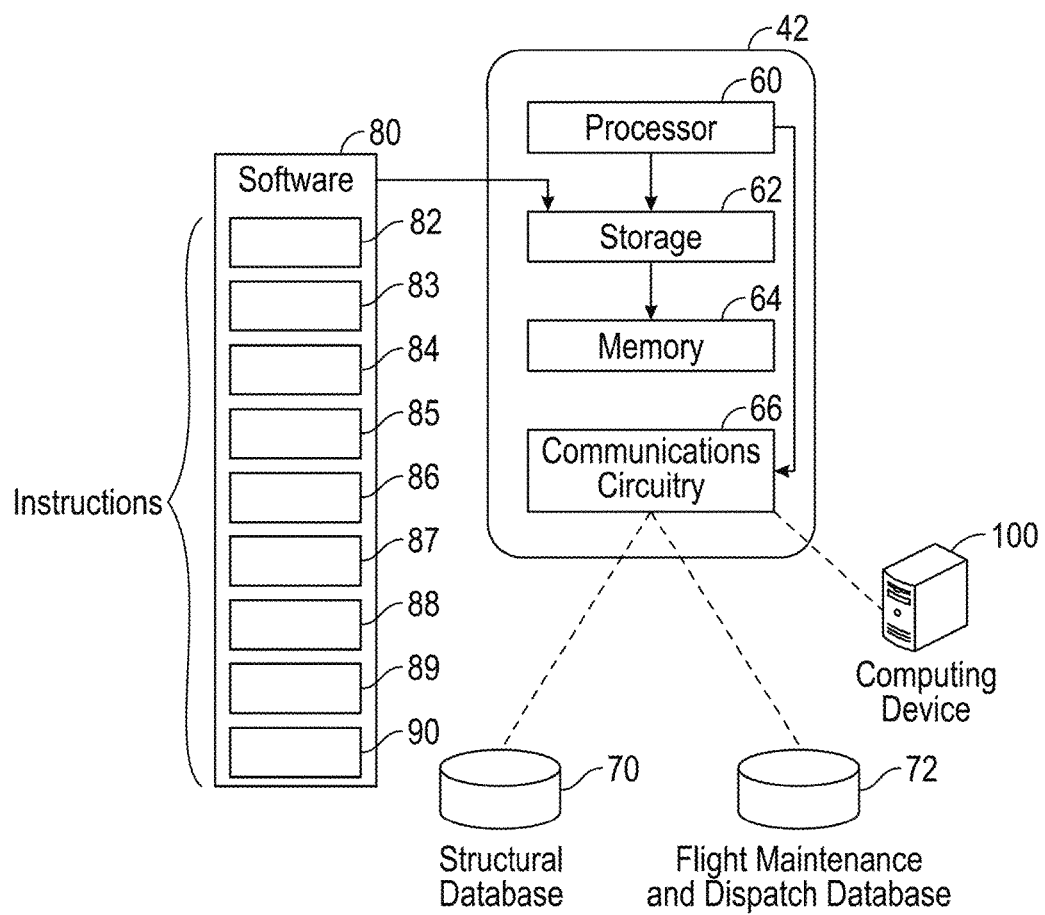
FIG. 3 is a schematic illustration of the portable electronic device including a processor, memory, storage, and communications circuitry.

FIG. 3 is a schematic illustration of the portable electronic device 42. As seen in FIG. 3, the electronic device 42 includes a processor 60, storage 62, memory 64, and communications circuitry 66. In one embodiment, the storage 62 and the memory 64 may be combined together. The communications circuitry 66 is any type of circuitry operative to connect to a communications network and to transmit communications (e.g., voice or data) from the electronic device 42 to other devices within a communications network. The communications circuitry 66 is operative to interface with the communications network using any type of communications protocol such as, for example, Wi-Fi (e.g., a 802.11 protocol), radio frequency (RF) systems (e.g., 900 MHz, 1.4 GHz, and 5.6 GHz communication systems), infrared, or global system for mobile communications (GSM). As seen in FIG. 3, the processor 60 is in communication with the storage 62, memory 64, and the communication circuitry 66.

The communications circuitry 66 is in communication with a structural database 70 and the flight maintenance and dispatch database 72 in order to transmit data and receive data to and from the portable electronic device 42. Both the structural database 70 and the flight maintenance and dispatch database 72 may be operated and maintained by an airline, and may be situated at a location that is remote from the aircraft 10 and the portable electronic device 42. For example, the structural database 70 and the flight maintenance and dispatch database 72 may be located at an airline's main maintenance hub (e.g., in the city of Chicago, Ill.) while the aircraft 10 and the portable electronic device 42 may be located at an airline outstation (e.g., Moline, Ill.).

Figure 5:
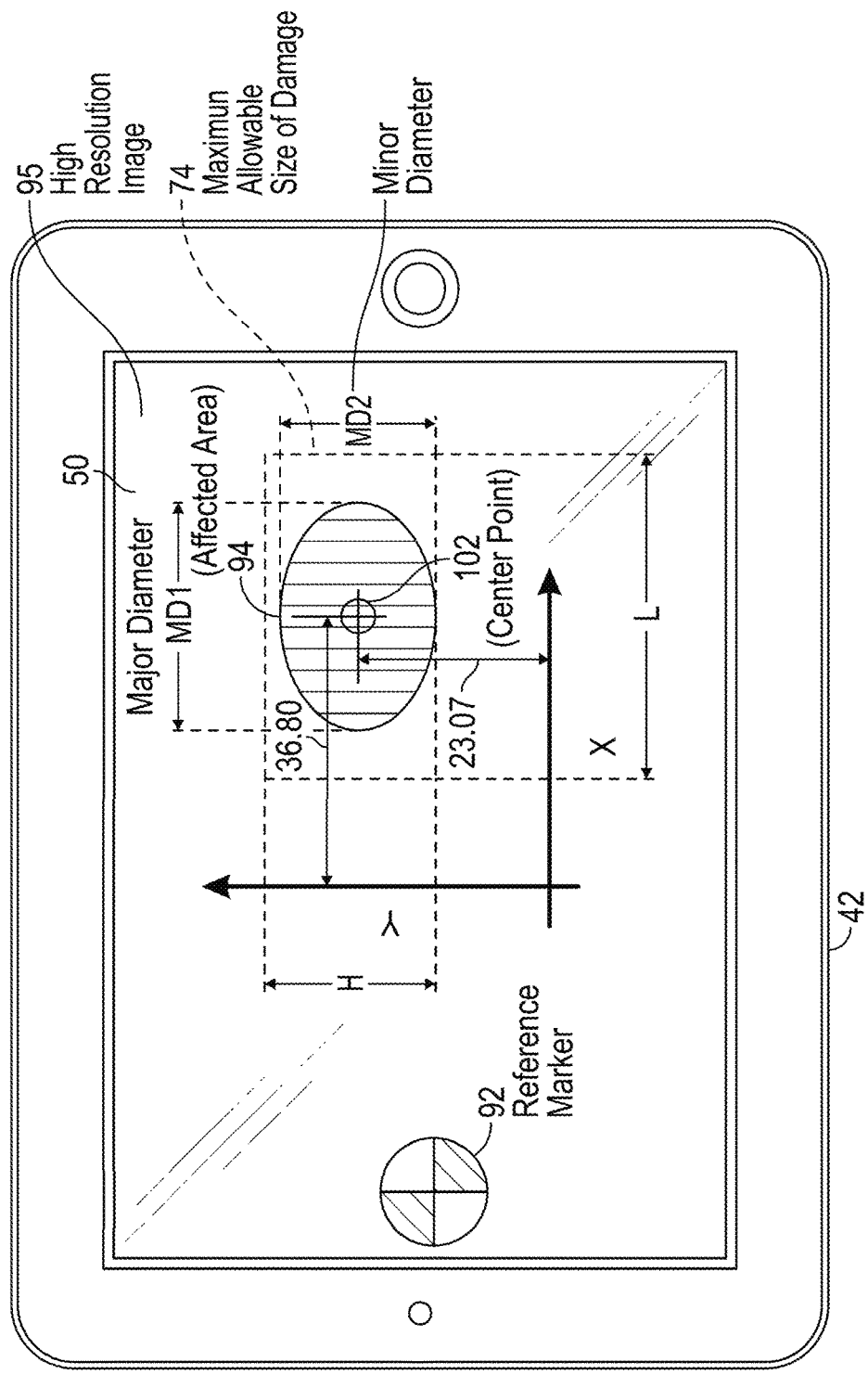
FIG. 5 is an illustration of the portable electronic device, where a second, high resolution image of an affected area of the aircraft and a reference marker are shown upon the display.

The structural database 70 includes information pertaining to the various types of damage which may occur to the outer skin 20 of various models of aircraft that the airline employs. For example, the structural database 70 includes coordinates or index points that create a template that defines a maximum allowable size of damage 74 (shown in FIG. 5) that may occur along the outer skin 20 or other exterior portion of the aircraft 10. FIG. 5 illustrates the maximum allowable size of damage 74 in phantom line. The maximum allowable size of the damage 74 may be a computer-generated image viewable on the display 50 of the portable electronic device 42. The maximum size of damage 74 may be based on an aircraft coordinate system, where the maximum allowable size of damage 74 to the exterior portion of the aircraft 10 includes a length L expressed in x-coordinates as well as a height H expressed in y-coordinates. It is to be understood that while FIG. 5 illustrates the maximum size of damage 74 as a rectangle, the maximum size of damage 74 may be any shape and include various other outlines as well. Moreover, those skilled in the art will appreciate that the maximum size of damage 74 may also be irregularly shaped as well. As explained in greater detail below, if the damage to the exterior of the aircraft 10 exceeds the maximum size of damage 74, then the aircraft 10 might need to be serviced first before further operation.

Turning back to FIG. 3, in addition to the coordinates that define the maximum allowable size of damage 74, the structural database 70 also includes positional information regarding the exterior features of various models of aircraft that the airline employs. Some examples of exterior features of an aircraft include, but are not limited to, windows, doors, outlets, painted markers or logos, and rivets. In particular, the structural database 70 includes positional information regarding the exterior features of the aircraft 10 based on the aircraft coordinate system. For example, the structural database 70 includes an x-coordinate as well as a y-coordinate position of the passenger windows 30, the exits 32, and the RVSM critical area 43 of the aircraft 10 (FIG. 1).

The flight maintenance and dispatch database 72 is operated by an airline in order to schedule service as well as various routes for the airline's fleet of aircraft. In particular, the flight maintenance and dispatch database 72 includes information pertaining to the maintenance scheduling of the various aircraft in an airline's fleet. Moreover, the flight maintenance and dispatch database 72 also includes information pertaining to the airline's flight schedule and dispatch. In particular, the flight maintenance and dispatch database 72 includes information regarding the specific aircraft that is scheduled to fly a specific route (e.g., New York City to Chicago).

Software 80 may be downloaded into the storage 62 of the portable electronic device 42. The software 80 includes a plurality of instructions 82, 83, 84, 85, 86, 87, 88, 89 and 90. The instructions enable an individual to assess visible damage to the outer skin 20 or other exterior structure of the aircraft 10 using the portable electronic device 42. In addition to assessing damage, the instructions also interacts with the flight maintenance and dispatch database 72. It is to be understood that the portable electronic device 42 may be used by an individual who does not have specialized training or knowledge to assess the damage to the aircraft 10 manually. For example, an airline pilot may use the portable electronic device 42. In other words, the portable electronic device 42 does not need to be operated by an airline mechanic or other individual who has special training in order to assess damage to the aircraft 10.

Referring generally to FIGS. 1-3, assessment of the damage to the aircraft 10 may now be explained. First, in one embodiment, an individual may input the specific model of the aircraft 10 (e.g., 787, 737, etc.) into the portable electronic device 42. For example, an individual may input a tail number (also referred to as a registration number) associated with the aircraft 10 using the user interface 52 of the portable electronic device 42. The tail number indicates the specific model of the aircraft 10. In an alternative embodiment, the portable electronic device 42 is associated with a specific aircraft 10. Thus, an individual may not need to enter the specific model of the aircraft 10, since the tail number is already saved within the memory 62 of the portable electronic device 42.

Figure 4:
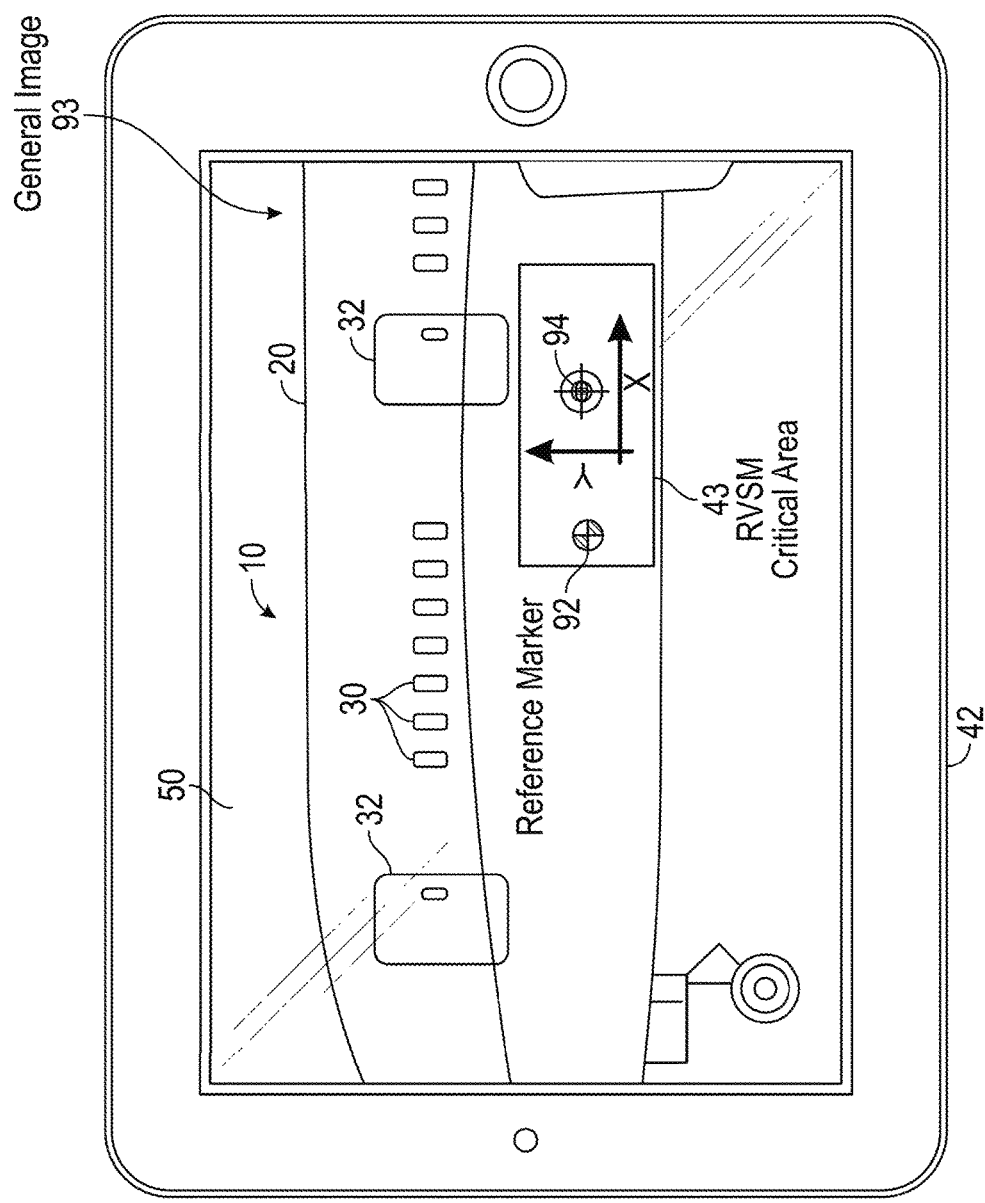
FIG. 4 is an illustration of the portable electronic device, where a general image of the aircraft is shown upon the display.

Once the model has been entered, the individual then places a reference marker 92 adjacent to the damaged portion of the aircraft 10 (the reference marker is illustrated in FIG. 4). Specifically, an individual places the reference marker 92 along the exterior of the aircraft 10, and adjacent to an affected area 94. The affected area 94 of the aircraft 10 represents the damaged portion of the aircraft 10 (i.e., a dent, buckle, indentation, etc.). The reference marker 92 is any type of indicator or object that may adhere or otherwise attach to the aircraft 10 such as, for example, a sticker. The reference marker 92 may include a predetermined or known size. For example, in one embodiment the reference marker 92 may include a diameter of about ten centimeters. Thus, as explained in greater detail below, when the reference marker 92 is placed adjacent the affected area 94, the size of the affected area 94 may be determined based on the known size of the reference marker 92 with the affected area 94. Once the reference marker 92 has been affixed to the exterior of the aircraft 10, then the individual may then take a general photograph or image 93 (shown in FIG. 4) of the aircraft 10 using the imaging device 44 (seen in FIG. 2B) of the portable electronic device 42.

Turning now to FIG. 4, an exemplary general image 93 of the aircraft 10 is illustrated on the display 50 of the portable electronic device 42. As seen in FIG. 4, the general image 93 of the aircraft 10 includes a portion of the passenger windows 30 as well as two exits 32. The general image 93 of the aircraft 10 also includes the affected area 94 of the aircraft 10, as well as the reference marker 92. Referring to FIGS. 3 and 4, the processor 60 of the portable electronic device 42 executes instruction 82, which generates the general image 93 shown on the display 50 of the portable electronic device 42.

Once the general image 93 is shown on the display 50 of the portable electronic device 42, the processor 60 of the portable electronic device 42 executes instruction 83. Instruction 83 compares the general image 93 of the aircraft 10 with the positional information regarding the exterior features of the aircraft 10 stored in the structural database 70, and calculates the position of the reference marker 92 based on the aircraft coordinate system. Specifically, instruction 83 compares the position of the reference marker 92 in relation to the various exterior features of the aircraft 10 (e.g., the windows 30, the exits 32, and the painted features upon the outer skin 20) with the information stored in the structural database 70. Instruction 83 then determines an x-coordinate as well as a y-coordinate position of the reference marker 92 based on the aircraft coordinate system.

The individual then takes a second, high resolution image 95 of the reference marker 92 and the affected area 94 of the aircraft 10, which is shown in FIG. 5. This is done in order to obtain a higher resolution image of the reference marker 92 and the affected area 94 of the aircraft 10. In other words, the individual may zoom in or focus upon the reference marker 92 and the affected area 94 of the aircraft 10. This means that the general image 93 (shown in FIG. 4) has a wider field of view (FOV) when compared to the high resolution image 95). The reference marker 92 is used to allow an individual to zoom or focus upon the reference marker 92 and the affected area 94 of the aircraft 10, without losing a reference position. Specifically, some of the exterior features that are present in the general image 93 (shown in FIG. 4) may no longer be included within the second, high resolution image 95 of the affected area 94. For example, the windows 30 and exits 32 may no longer be visible within the high resolution image 95. The reference marker 92 provides a constant reference point, even after the exterior features are no longer visible in the high resolution image 95 of the aircraft 10.

Referring to FIGS. 3-5, once the high resolution image 95 is taken, then the processor 60 of the portable electronic device 42 executes instruction 84. Instruction 84 allows for an individual to select a central point or area 102 of the affected area 94 that is shown upon the display 50. Specifically, instruction 84 generates a user prompt that is shown upon the display 50 of the portable electronic device 42 prompting an individual to select the central area 102 of the affected area 94. The individual then selects the central area 102 using the user interface 52 of the portable electronic device 42. For example, the individual may select the central area 102 by touching his or her fingertips against a touchscreen to select the central area 102.

Once the central area 102 of the affected area 94 is determined, the processor 60 of the portable electronic device 42 executes instruction 85. Instruction 85 overlays the maximum allowable size of damage 74 stored in the structural database 70 over the affected area 94 (this overlay is shown in FIG. 5). The central point 102 as selected by the individual is used as a reference point to accurately align the maximum allowable size of damage 74 with the affected area 94.

The processor 60 of the portable electronic device 42 then executes instruction 86. Instruction 86 determines the exact position of the central area 102 of the affected area 94 based on the aircraft coordinate system. Specifically, instruction 86 determines an x-coordinate as well as a y-coordinate of the central area 102 of the affected area 94 in relation to the aircraft 10. In the non-limiting embodiment as shown in FIG. 5, the x-coordinate and the y-coordinate is shown upon the display 50 of the portable electronic device 42, where the x-coordinate is 23.07 and the y-coordinate is 36.08.

Once the position of the affected area 94 based on the aircraft coordinate system is determined, the processor 60 of the portable electronic device 42 executes instruction 87. Instruction 87 determines if the affected area 94 is located within the RVSM critical area 43 of the aircraft 10 (seen in FIG. 1). Specifically, the processor 60 compares the positional information of the exterior features of the aircraft 10 stored in the structural database 70 with the position of the central area 102 of the affected area 94 calculated by instruction 86. If the central area 102 of the affected area 94 is located within the RVSM critical area 43 (FIG. 1), then the processor 60 determines that the affected area 94 is within the RVSM critical area 43.

The processor 60 executes instruction 88 after determining if the affected area is within the RVSM critical area 43. Instruction 88 determines an actual size of the affected area 94 based on the known size of the reference marker 94. Specifically, as explained above, the reference marker 92 includes a known size (e.g., ten centimeters). The known size of the reference marker 92 may be saved within the memory 62 of the portable electronic device 42 (FIG. 3). Instruction 88 may then use the known size of the reference marker 92 to determine the actual size of the affected area 94. Specifically, the reference marker 82 as viewed by the high resolution image 95 on the display 50 of the portable electronic device 42 is sized to a specific pixel size based on a scaling ratio. For example, if the reference marker 92 as viewed by the high resolution image 95 includes a diameter of ten pixels, then the scaling ratio is 1:1 (the known size of the reference marker 92 is ten centimeters). The scaling ratio is used to determine the actual size of the affected area 94 based on the pixel size of the affected area 94 as viewed by the high resolution image 95. For example, in the embodiment as described, if the scaling ratio is 1:1 and if a major diameter $M_{D1}$ of the affected area 94 includes twenty-five pixels in length, then actual length of the major diameter $M_{D1}$ of the affected area 94 is twenty-five centimeters. Likewise, if a minor diameter $M_{D2}$ of the affected area 94 includes fifteen pixels, then the actual size of the minor diameter $M_{D2}$ of the affected area 94 is fifteen centimeters.

Once the actual size of the affected area 94 is determined, the processor 60 executes instruction 89. Instruction 89 compares the actual size of the affected area 94 with the maximum allowable size of damage 74, and determines if the actual size of the affected area 94 exceeds the maximum allowable size of damage 74. For example, in the embodiment as seen in FIG. 5, the length L of the maximum allowable size of the damage 74 exceeds the major diameter $M_{D1}$ of the affected area 94 and the height H of the maximum allowable size of the damage 74 also exceeds the minor diameter $M_{D2}$ of the affected area 94. Thus, the actual size of the affected area 94 as seen in FIG. 5 does not exceed the maximum allowable size of damage 74. The maximum allowable size of the damage 74 may be a computer-generated image viewable on the display 50 of the portable electronic device 42, and provides a convenient reference to a user in order to easily see if the affected area 94 exceeds the maximum allowable size of the damage 74.

FIG. 5 illustrates the maximum allowable size of the damage 74 as a two-dimensional object (i.e., x and y coordinates express the length L and height H). However, if the imaging device 44 (FIG. 2B) is a stereoscopic camera, then the maximum allowable size of damage 74 may be viewed as a three-dimensional object (including an additional z-axis for measuring depth). Accordingly, the processor 60 may determine if the affected area 94 of the aircraft 10 exceeds the maximum allowable size of the damage using a three-dimensional coordinate system (i.e., the x, y, and z axis).

In the event the affected area 94 is located within the RVSM critical area 43 of the aircraft 10, or if the actual size of the affected area 94 exceeds the maximum allowable size of damage 74, then the processor 60 executes instruction 90. Instruction 90 sends the high resolution image 95 showing the reference marker 92 and the affected area 94 of the aircraft 10 over a data communications network and to a computing device 100 of a maintenance engineer or other qualified individual (the computing device 100 is shown in FIG. 3). The computing device 100 is any type of computer for viewing images of as well as analyzing the affected area 94 of the aircraft 10 such as, for example, a desktop computer, a laptop computer, a tablet, or a smartphone. Information regarding the actual size the affected area 94 as well as the position of the affected area 94 in aircraft coordinates is sent over the data communications network as well (i.e., the x-coordinate and the y-coordinate of the central area 102).

The maintenance engineer may inspect the high resolution image 95 of the affected area 94 using the computing device 100 and determine further corrective action. For example, the maintenance engineer may determine that the aircraft 10 should only be flown in non-RVSM airspace, depending on the severity and size of the affected area 94. In another embodiment, the maintenance engineer may determine that the aircraft 10 should be grounded until maintenance is performed. Once this is determined, the flight maintenance and dispatch database 72 is updated accordingly to reflect any changes in aircraft servicing and routing.

The flight maintenance and dispatch database 72 may be updated using several different approaches. Specifically, in one embodiment, an airline employee is notified of the corrective action and updates the flight maintenance and dispatch database 72 accordingly. In another embodiment, the computing device 100 of the maintenance engineer is linked or otherwise in communication with the flight maintenance and dispatch database 72. The computing device 100 transmits any updated information directly to the flight maintenance and dispatch database 72.

In the event the affected area 94 is not located within the RVSM critical area 43 of the aircraft, and the actual size of the affected area 94 is less than the maximum allowable size of damage 74, then the processor 60 may perform no other functions. The aircraft 10 is able to fly as normally scheduled.

Figure 6:
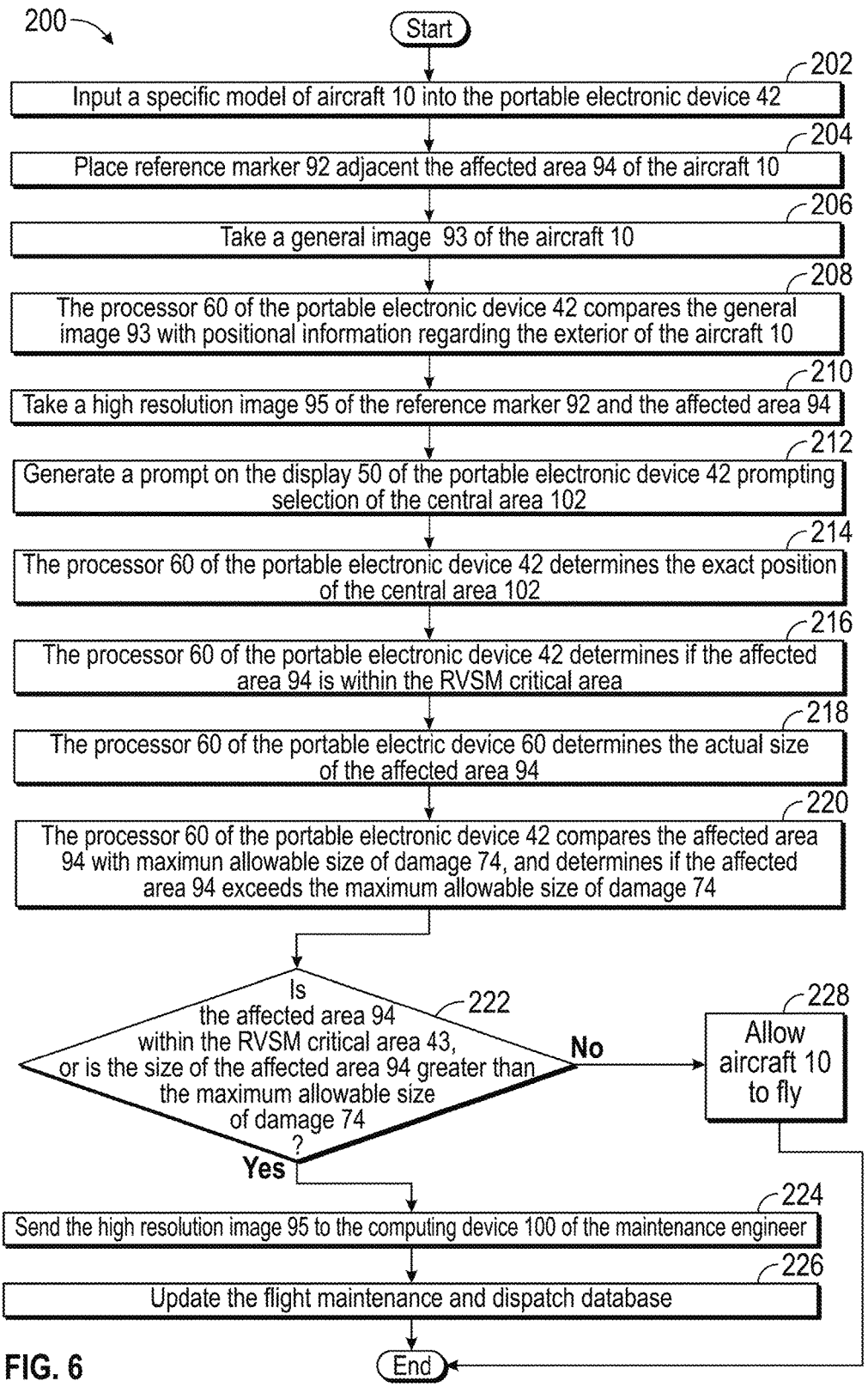
FIG. 6 is an exemplary process flow diagram illustrating a method of assessing damage to the aircraft as well as updating a structural database and a flight maintenance and dispatch database accordingly.

FIG. 6 is an exemplary process flow diagram illustrating a method 200 of assessing the aircraft 10 for damage using the augmented reality system 40. Referring generally to FIGS. 1-6, the method 200 begins at block 202. In block 202, an individual may input the specific model of the aircraft 10 into the portable electronic device 42. For example, an individual may input a tail number unique to the aircraft 10 using the user interface 52 of the portable electronic device 42. It is to be understood that block 202 is optional. Indeed, an individual may not need to enter the tail number in the event the portable electronic device 42 is associated with a specific aircraft 10, since the model information is already saved within the memory 62 of the portable electronic device 42. Method 200 then proceeds to block 204.

In block 204, an individual places the reference marker 92 along the outer skin 20 of the aircraft 10. Method 200 then proceeds to block 206.

In block 206, an individual takes the general image 93 of the aircraft 10 using the imaging device 44 of the portable electronic device 42. The general image 93 of the aircraft 10 is shown in FIG. 4. Method 200 then proceeds to block 208.

In block 208, the processor 60 of the portable electronic device 42 executes instruction 83. Instruction 83 compares the general image 93 of the aircraft 10 with the positional information regarding the exterior features of the aircraft 10 stored in the structural database 70, and calculates the position of the reference marker 92 based on the aircraft coordinate system. Method 200 then proceeds to block 210.

In block 210, the individual then takes the high resolution image 95 of the reference marker 92 and the affected area 94 of the aircraft 10. FIG. 5 shows the high resolution image 95 of the aircraft 10 on the display 50 of the portable electronic device 42. Method 200 then proceeds to block 212.

In block 212, the processor 60 of the portable electronic device 42 executes instruction 84. Instruction 84 generates a user prompt that is shown upon the display 50 of the portable electronic device 42 prompting an individual to select the central area 102 of the affected area 94. The individual may then select the central area 102 using the user interface 52 of the portable electronic device 42. For example, the individual may select the central area 102 by touching his or her fingertips against a touchscreen to select the central area 102. Method 200 then proceeds to block 214.

In block 214, the processor 60 of the portable electronic device 42 then executes instruction 86. Instruction 86 determines the exact position of the central area 102 of the affected area 94 based on the aircraft coordinate system. Method 200 then proceeds to block 216.

In block 216, the processor 60 of the portable electronic device 42 executes instruction 87. Instruction 87 determines if the affected area 94 is located within the RVSM critical area 43 of the aircraft 10. Method 200 may then proceed to block 218.

In block 218, the processor 60 executes instruction 88. Instruction 88 determines the actual size of the affected area 94 based on the known dimensions of the reference marker 94. Method 200 may then proceed to block 220.

In block 220, the processor 60 executes instruction 89. Instruction 89 compares the actual size of the affected area 94 with the maximum allowable size of damage 74 stored in the structural database 70. Instruction 89 also determines if the actual size of the affected area 94 exceeds the maximum allowable size of damage 74. Method 200 then proceeds to block 222.

In block 222, if the affected area 94 is within the RVSM critical area 43, or if the actual size of the affected area 34 exceeds the maximum allowable size of damage 74, then method 200 proceeds to block 224.

In block 224, the processor 60 executes instruction 90. Instruction 90 sends the high resolution image 95 showing the reference marker 92 and the affected area 94 of the aircraft 10 over a data communications network and to the computing device 100 of a maintenance engineer or other qualified individual. Method 200 may then proceed to block 224.

In block 224, the flight maintenance and dispatch database 72 is updated accordingly to reflect any changes in aircraft servicing and routing. For example, in one embodiment an airline employee is notified of the corrective action, and updates the flight maintenance and dispatch database 72 accordingly. In another embodiment, the computing device 100 of the maintenance engineer is linked or otherwise in communication with the flight maintenance and dispatch database 72. The computing device 100 transmits any updated information directly to the flight maintenance and dispatch database 72. Method 200 then terminates.

Referring back to block 220, in the event the affected area 94 is not located within the RVSM critical area 43 of the aircraft, and the actual size of the affected area 94 is less than the maximum allowable size of the damage 74, then method 200 then proceeds to block 226. In block 226, the aircraft 10 is able to fly as scheduled. Method 200 then terminates.

Referring generally to the figures, the disclosed augmented reality system provides a relatively simple, quick, cost-effective, and accurate approach for assessing damage to an aircraft. Airlines currently require an airline mechanic having specialized training or knowledge to assess the damage to an exterior of an aircraft. In contrast, the disclosed augmented reality system is easily used by an individual who does not have special training or knowledge regarding aircraft damage (e.g., an airline pilot) in order to quickly and accurately assess the aircraft. Finally, the disclosed augmented reality system may also communicate with flight maintenance and dispatch databases based on the type as well as the severity of the damage to the aircraft. The flight maintenance and dispatch databases are updated accordingly, which also saves time and cost for an airline.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A system for assessing an affected area of an aircraft, wherein a reference marker having a known size is placed along an exterior of the aircraft, the system comprising:
   a portable electronic device including a processor in communication with a structural database, wherein the structural database includes a template that defines a maximum allowable size of damage to the exterior of the aircraft, the processor executing instructions for:
      determining an actual size of the affected area based on the known size of the reference marker;
      comparing the actual size of the affected area with the maximum allowable size of damage to the exterior of the aircraft;
      determining if the actual size of the affected area exceeds the maximum allowable size of damage to the aircraft; and
      determining a further action based on the actual size of the affected area exceeding the maximum allowable size of the damage.

2. The augmented reality system as recited in claim 1, wherein the structural database includes positional information of exterior features of the aircraft.

3. The augmented reality system as recited in claim 2, wherein the processor executes an instruction for determining if the affected area is located within a reduced vertical separation minimum (RVSM) critical area of the aircraft based on the positional information stored in the structural database.

4. The augmented reality system as recited in claim 3, wherein the processor executes an instruction for generating a general image of the aircraft upon a display of the portable electronic device.

5. The augmented reality system as recited in claim 4, wherein the processor executes an instruction for generating a high resolution image of the aircraft upon the display, wherein the high resolution image is an enlarged view of the affected area of the aircraft and the reference marker.

6. The augmented reality system as recited in claim 5, wherein the further action is sending the high resolution image of the aircraft and the actual size of the affected area to a computing device of a maintenance engineer if the affected area is within the RVSM critical area.

7. The augmented reality system as recited in claim 5, wherein the further action is sending the high resolution image of the aircraft and the actual size of the affected area to a computing device of a maintenance engineer if the actual size of the affected area exceeds the maximum allowable size of the damage.

8. The augmented reality system as recited in claim 5, wherein the further action is allowing the aircraft to fly if the actual size of the affected area is less than the maximum allowable size of damage and the affected area is not within the RVSM critical area.

9. The augmented reality system as recited in claim 1, wherein the processor executes an instruction for generating an user prompt upon a display of the portable electronic device prompting an individual to select a central area of the affected area.

10. The augmented reality system as recited in claim 1, wherein the processor executes an instruction for calculating the position of the reference marker placed upon the exterior of the aircraft.

11. The augmented reality system as recited in claim 1, wherein the portable electronic device includes an imaging device.

12. The augmented reality system as recited in claim 11, wherein the imaging device is one of a stereoscopic camera, a digital camera and a video recorder.

13. The augmented reality system as recited in claim 11, wherein the imaging device is a stereoscopic camera, and wherein the processor determines if the size of the affected area exceeds the maximum allowable size of the damage based on a three-dimensional coordinate system.

14. The augmented reality system as recited in claim 1, wherein the processor is communication with a flight maintenance and dispatch database of an airline.

15. The augmented reality system as recited in claim 14, wherein the flight maintenance and dispatch database is located at an airline's main maintenance hub, and wherein the aircraft and the portable electronic device are located at an airline outstation.

16. The augmented reality system as recited in claim 1, wherein the portable electronic device is selected from the group consisting of: a smartphone, tablet computer, laptop computer, and a pair of augmented reality glasses.

17. A method of assessing an affected area located at an exterior of the aircraft using a portable electronic device, the method comprising:
    placing a reference marker adjacent the affected area of the aircraft, wherein the aircraft has a reduced vertical separation minimum (RVSM) critical area;
    calculating a position of the reference marker based on aircraft coordinates by a processor of the portable electronic device;
    determining, by the processor, an actual size of the affected area based on a known size of the reference marker;
    comparing, by the processor, the actual size of the affected area with a maximum allowable size of damage to the exterior of the aircraft, wherein a structural database in communication with the processor includes a template that defines the maximum allowable size of damage to the aircraft;
    determining, by the processor, if the actual size of the affected area exceeds the maximum allowable size of damage;
    determining, by the processor, whether the affected area is located within the RVSM critical area based on positional information of exterior features of the aircraft stored in the structural database and the position of the reference marker; and
    determining further action by the processor based on at least one of the actual size of the affected area and if the affected area is located within the RVSM critical area.

18. The method of claim 17, comprising inputting a specific model of the aircraft into the portable electronic device using a user interface of the portable electronic device.

19. The method of claim 18, comprising generating a general image of the aircraft upon a display of the portable electronic device.

20. The method of claim 19, comprising generating a high resolution image of the aircraft upon a display of the portable electronic device, wherein the high resolution image is an enlarged view of the affected area of the aircraft and the reference marker.

* * * * *